Feb. 20, 1968     R. H. GAPP     3,369,289
DIE-DRAW BLIND RIVET WITH DEFORMABLE DIE AND
THE METHOD OF SETTING SAME
Filed Nov. 27, 1964     2 Sheets-Sheet 2
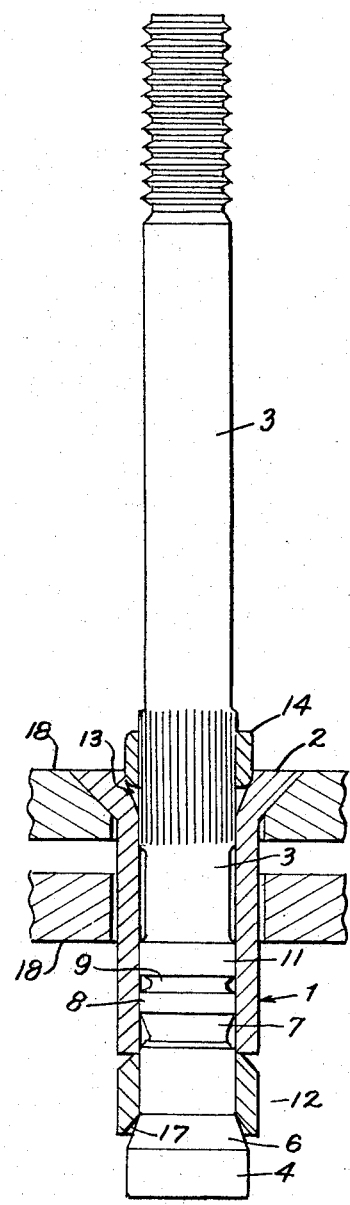
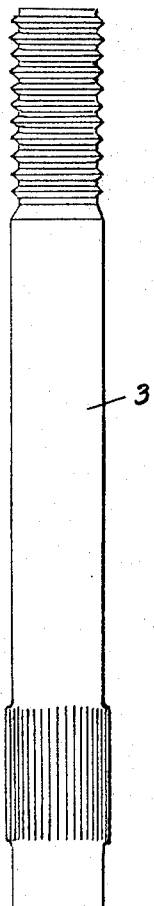
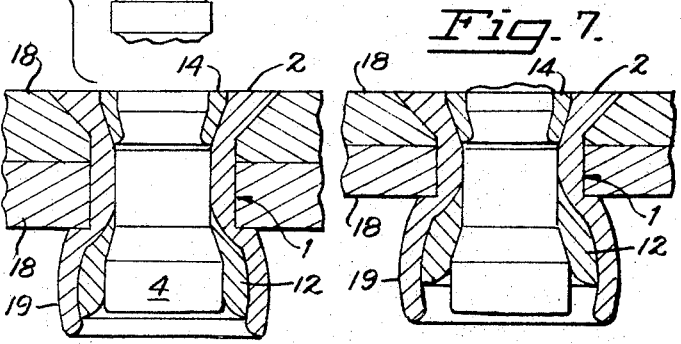
INVENTOR.
ROLAND H. GAPP
BY George B White
ATTORNEY.

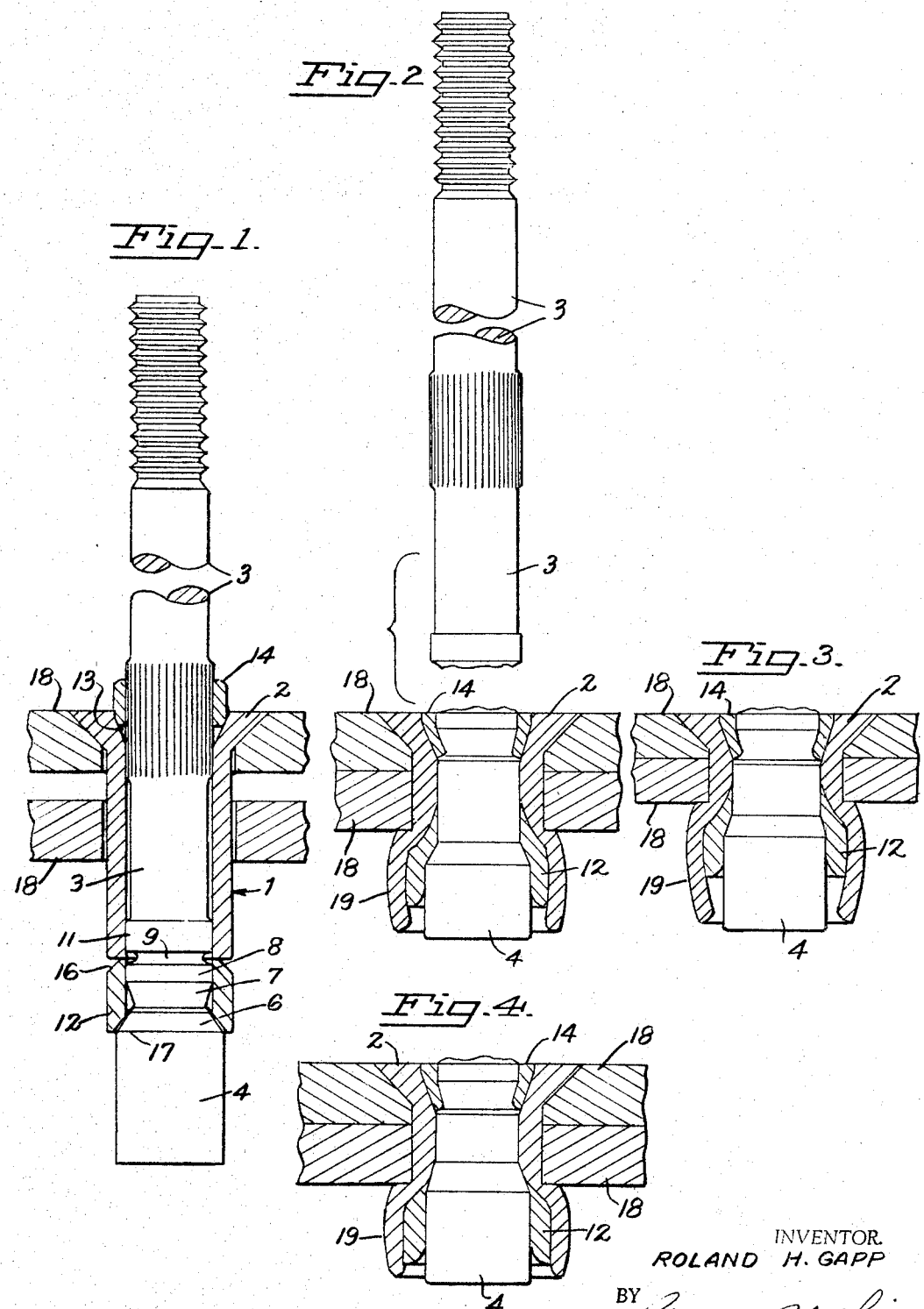

United States Patent Office 3,369,289
Patented Feb. 20, 1968

3,369,289
DIE-DRAW BLIND RIVET WITH DEFORMABLE DIE AND THE METHOD OF SETTING SAME
Roland H. Gapp, Santa Ana, Calif., assignor to Textron Industries, Inc. a corporation of Delaware
Filed Nov. 27, 1964, Ser. No. 414,182
5 Claims. (Cl. 29—512)

ABSTRACT OF THE DISCLOSURE

In a blind rivet, a stem is pulled through a tubular rivet shank, while a rivet head on the rivet shank is held against the work, thereby to pull a former head on the tail end of the stem into the tail end, or blind end, of the tubular rivet shank so as to enlarge the tail end of the tubular rivet shank and clinch it against the blind side of the work; a die sleeve is positioned around the stem at said former head, and said tubular rivet shank is placed on said stem against said die sleeve; the die sleeve has a frusto-conical external end surface adjacent the tail end of the rivet shank and a frusto-conical internal end surface adjacent said former head; the die sleeve being harder than the rivet shank but softer than the former head of said stem, thereby to expand the tail end of the shank against the adjacent blind side of the work when the die is pulled into the tail end of the rivet shank, and then expand said die sleeve for further expanding said rivet tail end when said former head is pulled into said die sleeve; the relative hardness of said former head being such that after expanding said die sleeve and said tail end against the work, upon further pulling of the stem said former head is wiredrawn through said die sleeve to a predetermined length corresponding to the thickness of the work; a locking collar on the pulling stem outside said rivet head is swaged into said rivet head and into a locking groove in said stem to lock the rivet stem in said clinching position.

---

The primary object of this invention is to provide a method and a rivet assembly wherein the blind head is formed by a relatively deformable die acting together with a deformable rivet shank of such hardness that after the deformable die is drawn into the blind end or tail of the rivet shank it expands the tail of the rivet shank into a tulip or blind head against the sheets and then the die itself is also expanded to a limited extent to allow the former head on the tail of the stem to be pulled partially into the die, and then the constricting force of the die and of the surrounding expanded rivet shank causes the former head to wiredraw through the shank after the sheets are tightly clinched together; the stem being pulled and wiredrawn to a selected distance depending on the thickness of the sheets; means being provided to interlock the stem with the head of the rivet after the rivet is set, so that upon further pulling of the stem it will break at about the level of the top of the rivet head; this rivet assembly and method also lending to the rivet the ability to perform effectively over a large range of grip thickness.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

FIG. 1 is a partly sectional view of the rivet assembly in the work just before the stem is pulled through the rivet shank.

FIG. 2 is a partly sectional view of the assembly rivet in the work at the time the stem is fractured.

FIG. 3 is a partly sectional view showing the rivet in the work of thinner grip than the work in FIG. 2.

FIG. 4 is a partly sectional view showing the rivet with a softer die than the die in FIG. 2.

FIG. 5 is a partly sectional view of a modified form of the rivet assembly in the work.

FIG. 6 is a partly sectional view showing a modified form of the rivet assembly after it is set, and FIG. 7 is a partly sectional view of the rivet assembly set in sheets thinner than those shown in FIG. 6.

The basic parts of the rivet assembly include a tubular rivet shank 1 with a rivet head 2 at one end, and a stem 3 which extends through the shank 1 and the head 2. The stem 3 has on its tail end a blind former head 4. This blind former head 4 is generally cylindrical and it has a frusto-conical entrance or connecting portion 6. Next to this frusto-conical portion 6 is a locking groove 7 in the stem followed by a short cylindrical portion 8 and a break-neck groove 9. Above the break-neck groove 9 is another cylindrical portion 11 followed by portion of the stem 3 engaged for pulling the stem 3 through the rivet shank 1 and rivet head 2. The cylindrical portion 8 and the other cylindrical portion 11 are substantially of the same diameter and are of larger diameter than the stem 3. The blind former head 4 is larger than those other cylindrical portions but not larger in diameter than the rivet shank 1.

Around intermediate cylindrical portion 8 and around the locking groove 7 is positioned a cylindrical die 12. The rivet head 2 has a recess 13 therein into which is swaged a locking collar 14 after the locking groove 7 is positioned into the recess 13, so as to lock the stem to the rivet head by a rivet setting tool of the type described in U.S. Patent 3,038,626 of Walter R. Simmons on June 12, 1962.

The die 12 has a frusto-conical portion 16 adjacent to the tail of the rivet 1. A frusto-conical recess 17 in the lower end of the die 12 surrounds the frusto-conical portion 6 at the former head 4 and loosely fits over said portion 6.

In this form of the invention the hardness or ductility of the die 12 relatively to the ductility of the shank 1 and of the blind former head 4 is such that as the die 12 is pulled into the tail of the shank 1 it expands the tail of the shank 1 into a tulip against the adjacent side of the work such as the superimposed sheets 18, but as further pulling force is exerted on the stem 3, then, due to the relative hardness of the blind former head 4 the latter will enter partially into the die 12 and expand the die 12 and expand the die 12 so as to further expand the tulip or bulb 19 formed on the tail of the shank 1 against the adjacent side of the sheet 18.

Then, upon further pull exerted on the stem 3, the relative ductility, namely the resistance of the die and the expanded tail of the shank 1 to further expansion is such that it cannot be overcome by the former head 4 and therefore the frusto-conical portion 6 and the former head 4 will be wiredrawn through the die until the locking groove 7 is positioned in the recess 13 of the rivet head 2. Thereupon the collar 14 is swaged into the locking groove 7 as shown in FIG. 2, and upon still further pulling of the stem 3, the stem will break at the break-neck groove 9 as shown in FIG. 2.

The deformation of the die 12 in this invention is such that part of the material of the die is being pulled into the shank 1 as the blind former head 4 is wiredrawn thereby to expand the shank 1 against the adjacent walls of the hole in the sheets 18.

In the embodiment shown in FIG. 3 the thickness of the sheets 18 is less than those in FIG. 2 and therefore the former head 4 is wiredrawn to a lesser extent.

In the embodiment shown in FIG. 4 the die 12 is softer than the dies on the previous forms so that the die 12 is expanded to form a larger blind head 19, but the hardness of the rivet shank 1 is still sufficient to cause the head to wiredraw into and through the shank 1 as the stem is pulled for the final setting of the rivet.

The modified form shown in FIGS. 5, 6 and 7, differs from the previous forms in that the former head 4 is of such hardness that it resists wiredrawing and expands the die 12 as the former head 4 is pulled into the die 12 to the extent required by the thickness of the material as illustrated by the difference in FIGS. 6 and 7. In other respects the operation of this embodiment is substantially the same as the embodiments previously described.

An example of materials of relative ductility which have been successfully used in carrying out this invention is the combination of the following: the shank 1 made of 5056 annealed aluminum; the die 12 of annealed Monel metal, and the head 4 of heat treated 2017 aluminum alloy.

I claim:
1. A rivet assembly for tightly securing sheets together, said rivet assembly including
    (a) a tubular rivet shank fitting into registering holes in the sheets,
    (b) a rivet head on one end of said rivet shank,
    (c) a tail end on the rivet shank,
    (d) a stem extending through said shank and head,
    (e) a pulling portion of said stem extending beyond said rivet head and being engageable to pull the stem through said rivet,
    (f) a radially enlarged blind former head on the blind end of said stem,
    (g) the improvement of a die sleeve surrounding said stem at said rivet tail end, said die sleeve having a frusto-conical external end surface adjacent the tail end of the rivet shank and a frusto-conical internal end surface adjacent said former head,
    (h) the die being harder than the rivet shank but softer than the former head of the stem, thereby to expand the tail end of the shank against the adjacent side of the sheet when the die sleeve is pulled into the tail end of the rivet shank and then expand said die sleeve for further expanding said rivet tail end when said former head is pulled into said die sleeve.
2. The rivet assembly defined in claim 1 and
    (i) the relative hardness of said former head being such that after expanding said die sleeve and said tail end against the work upon further pulling of the stem said former head is wiredrawn through said die sleeve to a predetermined length corresponding to the thickness of the sheets.
3. The rivet assembly defined in claim 1 and
    (i) coating securing means on said stem and in said rivet head being in co-operative position when said former head is pulled into said die sleeve to a selected extent.
4. In the method of setting a blind rivet assembly having a rivet shank with a rivet head on one end thereof and, a tail end, and a pulling stem extending through said shank and head, an enlarged former head on the end of the stem adjacent said tail end, and coacting locking means on said stem and in said rivet head, the steps of
    (a) positioning a die around said stem at said tail end, said die being harder than said shank but being more ductile than said former, said die sleeve having a frusto-conical external end surface adjacent the tail end of the rivet shank and a frusto-conical internal end surface adjacent said former head,
    (b) placing the tubular rivet shank on said stem against said die,
    (c) inserting the rivet assembly through holes in the work,
    (d) enlarging the tail end of the rivet shank into a blind head by pulling the stem while holding the rivet head against the work, thereby pulling said die into the tail end of the rivet shank until the blind head is pressed against the adjacent side of the work,
    (e) further enlarging the tail end of the rivet by pulling said stem until said locking means are in coacting position thereby pulling the enlarged former head into said die to expand said die and to further expand said tail end.
5. The method of setting the blind rivet as defined in claim 4 and
    (e) said enlarged former being of such ductility that after the expansion of said die and said rivet tail said enlarged former is wiredrawn by the pull on the stem until said coacting locking means are in operative position.

References Cited

UNITED STATES PATENTS

| | | | |
|---|---|---|---|
| 2,372,222 | 3/1945 | Mullgardt | 85—78 |
| 2,397,111 | 3/1946 | Huck | 85—70 X |
| 3,038,626 | 6/1962 | Simmons. | |
| 3,292,482 | 12/1966 | Fry et al. | |

CHARLIE T. MOON, *Primary Examiner.*